No. 633,186. Patented Sept. 19, 1899.
C. FORCKE & N. FRINGS.
MACHINE FOR COVERING CONFECTIONERY WITH CHOCOLATE.
(Application filed Nov. 18, 1898.)
(No Model.) 3 Sheets—Sheet 1.
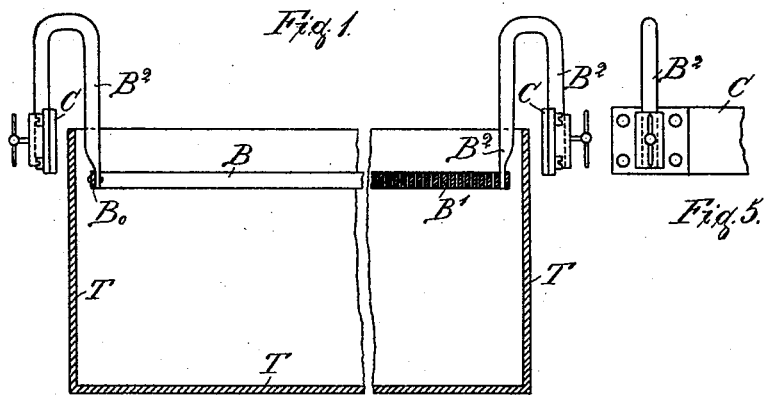
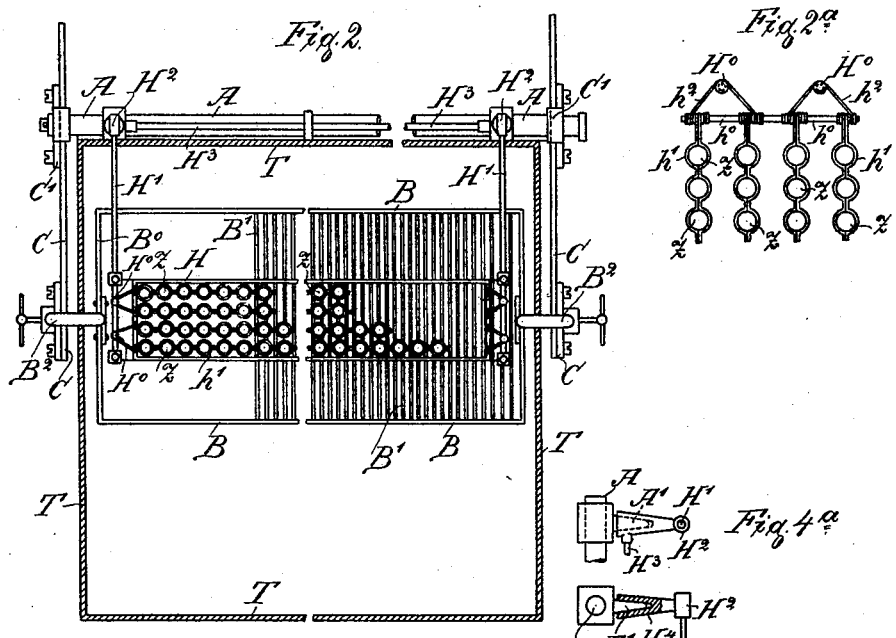
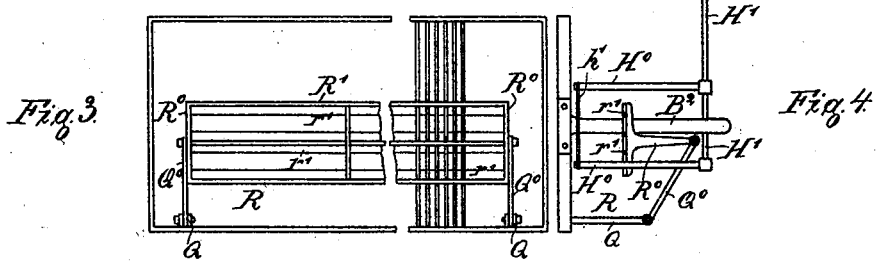
Witnesses:
Carl Ruys
Arthur Scholz
Inventors
Carl Forcke.
Nicolaas Frings.
by Robert Kiefer
Attorney.

No. 633,186. Patented Sept. 19, 1899.
C. FORCKE & N. FRINGS.
MACHINE FOR COVERING CONFECTIONERY WITH CHOCOLATE.
(Application filed Nov. 18, 1898.)
(No Model.) 3 Sheets—Sheet 2.
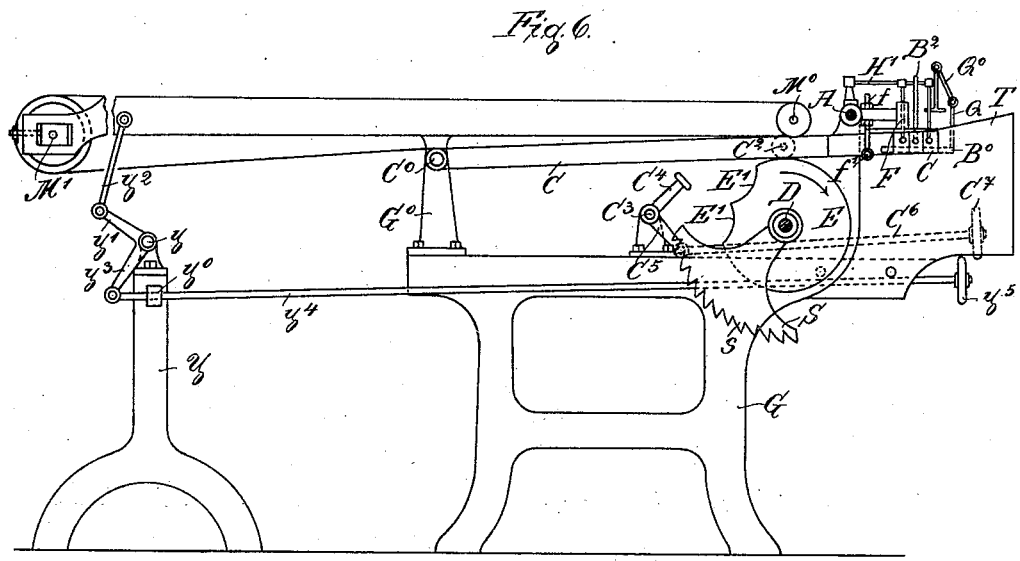
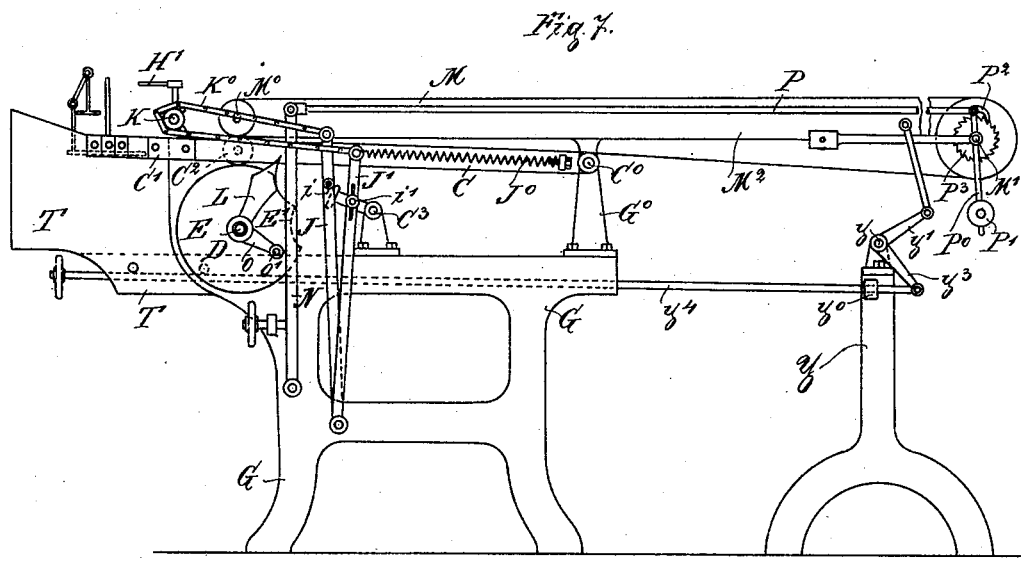
Witnesses:
Carl Ruff.
Arthur Scholz
Inventors
Carl Forcke.
Nicolaus Frings,
by Robert Keisler
Attorney.

No. 633,186. Patented Sept. 19, 1899.
C. FORCKE & N. FRINGS.
MACHINE FOR COVERING CONFECTIONERY WITH CHOCOLATE.
(Application filed Nov. 18, 1898.)
(No Model.) 3 Sheets—Sheet 3.
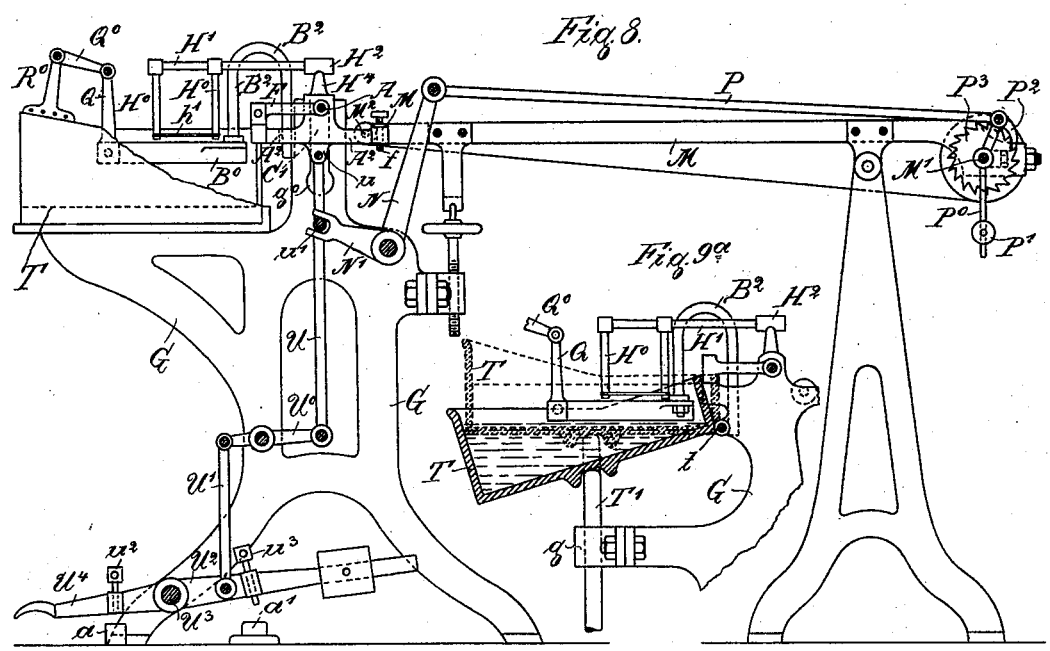
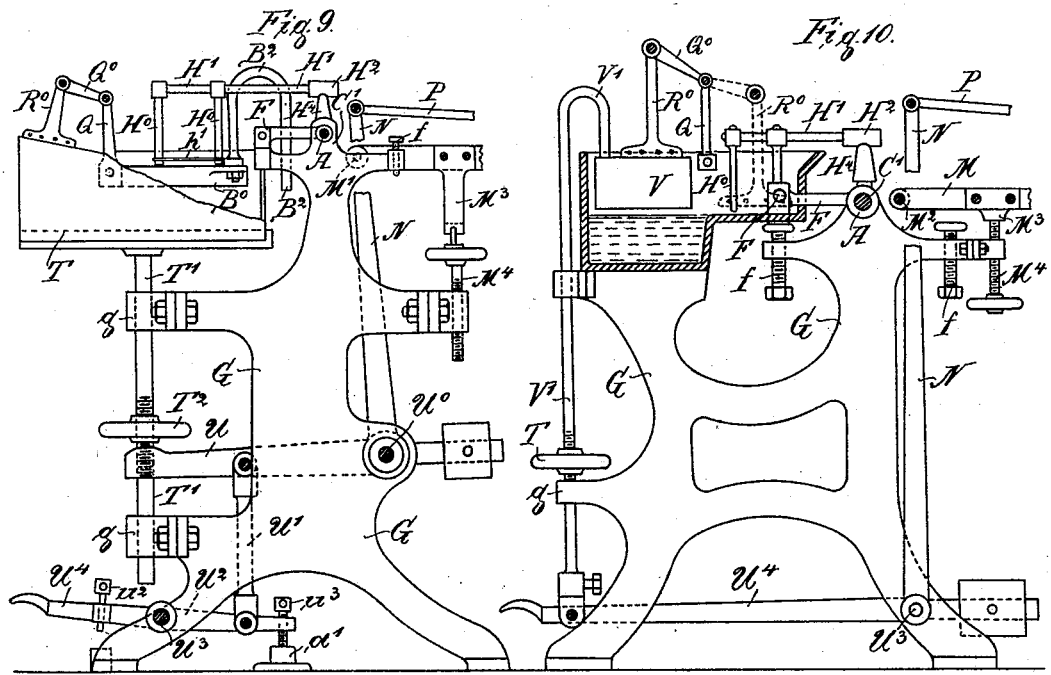
Witnesses:
Carl Ruff.
Arthur Scholz.
Inventors
Carl Forcke.
Nicolaus Frings.
by [signature]
Attorney.

UNITED STATES PATENT OFFICE.

CARL FORCKE AND NICOLAUS FRINGS, OF HANOVER, GERMANY.

MACHINE FOR COVERING CONFECTIONERY WITH CHOCOLATE.

SPECIFICATION forming part of Letters Patent No. 633,186, dated September 19, 1899.

Application filed November 18, 1898. Serial No. 696,798. (No model.)

*To all whom it may concern:*

Be it known that we, CARL FORCKE and NICOLAUS FRINGS, subjects of the King of Prussia, German Emperor, and residents of Hanover, in the Province of Hanover, German Empire, have invented certain new and useful Improvements in Machines for Covering Confectionery with Chocolate, (for which patent applications were filed in Great Britain, under No. 18,186, on the 24th of August, 1898; in France on the 26th of August, 1898, and in Germany on the 21st of September, 1898,) of which the following is an exact specification.

This invention relates to improvements in machines for covering confectionery, biscuits, and the like with chocolate and the like, and has for its object various improvements in the construction of the same.

In order to make our invention more clear, we refer to the accompanying drawings, in which similar letters denote similar parts throughout the several views, and in which—

Figure 1 is a vertical section through the trough of our improved machine. Fig. 2 is a plan view of the same, showing the grate. Fig. $2^a$ is a part of the net drawn to a larger scale. Fig. 3 is a plan of the grating and steadying device. Fig. 4 is a side view of Fig. 3, showing also the net and turning or laying over device. Fig. $4^a$ is a further side view of the turning device. Fig. 5 is a side view of the upper portion of Fig. 1. Figs. 6 and 7 are side views of the entire machine. Figs. 8, 9, $9^a$, and 10 are machines showing modified methods of actuation.

Proceeding to describe the drawings, the articles Z to be covered with chocolate or the like are washed or covered with the desired liquid covering at the points where such covering is required, then removed from the liquid, freed from the excess of such liquid by shaking, and then by a turning or laying over operation brought upon a transporting-cloth and moved forward by said cloth away from the trough. First, to remove the said articles from the liquid; second, to effect the beforementioned shaking, and, third, the beforementioned turning or laying over of the articles upon the transporting-cloth, and, furthermore, to prevent the turning mechanism dipping into the liquid—to effect all these operations with the least amount of loss of the covering liquid the articles are placed in nets $h$, of wire or perforated metal of suitable form, attached to the net-carrier H. Said net-carrier H is connected to the shaft A in such manner that the same may be put in and out of gear for the purpose of removing the articles already coated or covered and substituting therefor fresh articles for treatment.

The covering or coating liquid is contained in a trough T, and the operation of coating the articles may be carried out or effected by either of the following methods or systems: (1) The trough may be fixed and the net containing the articles to be coated then lowered into the liquid, or (2) the trough may be entirely or partly raised and the net be fixed or immovable, or (3) the trough and the net may not change position, but the liquid in the trough may be raised to such an extent that the articles suspended in the trough become coated with the coating liquid as desired.

In order to prevent the articles changing their position in the net during the operation of covering or coating, we retain or present such articles in position or steady the same by means of a holding or steadying device R, suspended in the liquid.

For the methods or systems mentioned under 1 and 2 it is desirable to work the liquid through or to stir the same from time to time in order to prevent any deposit or sediment forming in the trough, which operation, however, is scarcely necessary for the method mentioned under 3.

The machine can be actuated either by hand or mechanical power. Furthermore, we may also arrange that all movements necessary for the actuation of the machine take place from a shaft D, which in its turn may be driven either by foot, by a hand-lever, or by machine-power.

The net-carrier H for all three methods or systems mentioned under 1 to 3 is illustrated in Figs. 1 to 3 and the steadying device R in Figs. 3 and 4.

The net of the machine shown in Figs. 2 and $2^a$ is more especially adapted for the coating of round articles, and consists, as represented in the said figures, of four rows of round meshes formed by the wires $h'$, attached at their ends to the cross-wires $h^0$.

The said meshes are attached by means of shackles or eyelets $h^2$ to the under ends of the rods $H^0$, at which points the said rods are grooved. These rods $H^0$, in accordance with the width of the net, are adjusted on the rods $H'$ and then fastened in position, said rods $H'$ being arranged in square sockets $H^2$, connected by the rod $H^3$.

In this specification by the net-carrier H we always understand the combination of the parts $H^0$ $H'$ $H^2$ $H^3$.

The changeable or detachable connection of the net-carrier H with the turning or laying over shaft A can, as shown, be effected in such manner that the square socket $H^2$ is provided at its lower end with a tapered or conical socket $H^4$, in which the conical pin $A'$, attached to the shaft A, enters; or, inversely, the square socket may be provided with a conical pin, which would then be arranged to enter corresponding apertures in the said shaft A.

The holding or steadying device R consists of the vertical rods or supports Q, upon which the frame $R'$ is suspended by means of the arms $R^0$ and the links $Q^0$. To the crosspieces of the frame $R'$ the wires $r'$ are attached, which when $R^0$ is pressed downward cause the said wires to bear slightly upon the bodies to be coated by the liquid.

Figs. 6 and 7 show two side views of a coating-machine, the details of which are shown in Figs. 1 to 4. All the movements can be transmitted by the shaft D, which, as hereinbefore indicated, can be driven or actuated by hand or machine power. The trough T is rigidly connected to the frame G, upon which the standards $G^0$ are attached. In these standards are the bearings for the shaft $C^0$, upon which shaft the levers C are located, and at the front ends of said levers are the vertically-adjustable shackles $B^2$. These shackles, as shown in Fig. 1, project into the trough T and support the side pieces $B^0$ of the frame B. To the longitudinal sides of this frame the rods $B'$, forming a kind of grating, are attached, said grating having the purpose of stirring the liquid and when necessary supporting the net $h$. Upon the said levers C the bearings $C'$ of the shaft A and the rollers $C^2$ are located, said rollers $C^2$ being supported by the disks E, provided with one or more recesses $E'$, the said disks rotating with the driving-shaft D. The net $h$ is suspended above this grating, the said steadying or holding device R being connected by the vertical supporting-rods Q to the front side B of this grating, as shown in Figs. 3 and 4. The lowering of the net is effected by the sliding of the rollers $C^2$ into the recesses $E'$ of the disks E, the number of such descending movements being, of course, in accordance with the number of the said recesses $E'$. It will be clear that the bodies or articles to be coated and thus lowered into the liquid will be covered, either entirely or only partly, in accordance with the depth to which they are depressed into the liquid. The subsequent rotation of the disks E will, as is clear, cause the rollers $C^2$ to again travel along the outer circumference of the disk E, whereby, as is clear, the articles will be raised out of the liquid.

For the purpose of removing the drops from the coated articles I employ the toothed segment S, which is keyed upon the shaft D, the teeth $s$ of which engage under the pin $f'$ of the adjusting-screw $f$. This adjusting-screw $f$ is arranged upon a hammer F, fixed upon the shaft A. When, now, the teeth $s$ engage with the pin $f'$, the said hammer is lifted, whereas when the pin $f'$ drops into a recess of the said toothed segment the hammer F falls and strikes the lever C, whereby the lever C, the shaft A, and the net-carrier H, as well as the coated articles, are shaken, and owing to the revolution of the shaft A the coated articles are placed upon the transporting-cloth. The revolution of the shaft A amounts to one hundred and eighty degrees, and is effected by a lever L upon the shaft D, which strikes after the shaking operation against the rollers $i$ and $i'$ of the levers J and $J'$. The lever J engages with one end of the chain $K^0$, which runs around a sprocket-wheel K, and at its other end is attached to the spring $J^0$ of the lever $J'$, which is pivoted to the frame and holds the chain in tension.

The lever L, after the completion of the shaking movement and upon the further revolution of the shaft, comes in front of the roller $i$ and pushes against it, thus pressing the lever J to the right, Fig. 7, whereby the shaft A is so rotated that the articles to be coated come to lie upon the transporting-cloth. When the lever J is pushed to the right, the lever $J'$ has moved so far to the left that the lever L strikes against the same, thereafter the spring $J^0$ brings the lever $J'$ back to its original position and the return movement of the shaft A takes place.

The transporting-cloth M travels at both ends upon rollers, the shafts of which, $M^0$ and $M'$, are journaled in the ⊏-shaped rails $M^2$. Upon the shaft $M'$ a ratchet $P^3$ is arranged, which is rotated by a pawl $P^2$ upon the rod P. This rod P is at its other end connected with a lever N, which is turned to the right at a suitable moment by the roller $O'$ of the lever O upon the shaft D. By this movement the transporting-cloth with the coated articles upon the same is moved to the required extent. The return movement of the said ratchet with the rod P is effected by means of the weight $P'$ on the arm $P^0$.

The various kinds of articles to be coated not having the same height it is necessary that the front end of the transporting-cloth be so adjusted that the articles can lie upon the same without pressure. For this purpose the ⊏-shaped rails are pivoted upon the shaft $C^0$ and at their rear end connected by the link $y^2$ with the double crank-lever $y'$ $y^3$, which is pivoted at $y$ upon the standard Y. The vertical adjustment of the transporting-cloth is effected by the turning of the hand-wheel $y^5$, the shaft $y^4$ of which is provided with a screw-thread and guided in the nut $y^0$, the shaft $y^4$ engaging with the arm $y^3$ of the double crank-lever $y'$ $y^3$.

In order to obtain the necessary adjustment of the depth to which the articles to be coated shall descend into the liquid, the shaft $C^3$ with the levers $C^4$ is journaled in standards upon the frame, said levers coming against the lever C and being adjustable by the hand-wheel $C^7$, the shaft $C^6$ of which engages with the lever $C^5$, attached to the lever $C^4$.

Figs. 8 to 10 show the covering-machine with pedal actuation for effecting the movement of the liquid and the transporting-cloth, the shaking and turning movement of the articles being effected by hand. The machine is illustrated in these drawings for all three cases, in which similar letters denote similar parts of Figs. 1 and 2.

Fig. 8 shows the machine in elevation, in which $g^0$ are slots in the standard of the frame. On the bearings $C'$ of the turning-shaft A, said bearings being adjustable in these slots, is an extension $A^2$, upon which the hammer F, rotatable upon the shaft A, strikes. To this extension are also the shackles $B^2$, attached for the grating B $B^0$, and the before-mentioned steadying device R. The handle $F'$ of the hammer F serves to strike upon the said extension $A^2$ and to effect the rotation of the shaft A for the purpose of turning or laying the articles over. In the bifurcated lower end of the bearings $C'$ are the rods U, suspended and connected with the shaft $U^3$ of the pedal $U^4$ by means of the levers $U^0$, rods $U'$, and levers $U^2$. The pin $u'$ rests in the fork $N'$ of the bell-crank lever N $N'$, the arm N of which presses forward the rod P of the pawl $P^2$, engaging with the ratchet $P^3$, thereby causing the transporting-cloth to be rotated. The weight $P'$ of the arm $P^0$ brings the pawl $P^2$ back again to its original position. If the pedal is pressed down then, as shown in Fig. 8, also the turning-shaft A, with the net-carrier H and the net $h$, descends, whereupon the articles Z become immersed in the trough liquid and are herein prevented from rising by the steadying device R, operated by hand. The said trough is shown in the drawings partly broken away. If the pedal $U^4$ again ascends, the bodies Z emerge from the liquid and the lever N carries the transporting-cloth M forward. The steadying device B is now removed, whereupon by blows with the hammer F upon $A^2$ the net-carrier with the articles Z are shaken and the superfluous liquid is then freed from the same, as also by turning the hammer F to the other side, as shown in dotted lines, the shaft A being thereby also turned and the covered or coated articles laid over upon the transporting-cloth. The extent of the revolution of the shaft A is regulated by the adjusting-screw $f'$ and the depth to which the articles are lowered in the liquid is adjusted by the screws $u^2$ and $u^3$, as well as by the striking-pieces $a$ and $a'$. The adjustment of the height of the transporting-cloth, journaled in the block X, is effected by turning the adjusting-screws $M^4$ by means of the hand-wheel of the same.

The view of the machine shown in Fig. 9 is for system 2, in which construction the trough is lifted, the said trough being shown on the drawings with one side wall partly broken away. The shaft A with the net-carrier H and the net $h$ is journaled in the frame, as also the shackles $B^2$ with the grating-frame, and the steadying device R rigidly connected to said frame. On the other hand, the trough T is lifted by the rod $T'$, journaled in the bearings $g$ $g$ in such manner that the lever U presses or engages under the hub of the adjustable hand-wheel $T^2$, attached to the rod $T'$. The lever U rests upon the shaft $U^0$, and is connected by the rod $U'$ of the lever $U^2$ with the shaft $U^3$ of the pedal $U^4$, and upon the descent or pressing down of the said pedal the trough ascends. Thus the liquid washes the articles in the net $h$, held down by the steadying device, said articles when the pedal is lifted being removed from the liquid. The articles are now struck by the hammer F and are thus freed from the drops, whereupon by the revolution of the hammer F and the thereby following revolution of the shaft A the said articles are turned over or brought upon the transporting-cloth. The said transporting-cloth is carried forward upon the ascent of the trough by means of the lever N upon the shaft $U^0$, as already described with reference to Fig. 8. The extent of the vertical or up-and-down movement of the trough can also be regulated by the adjusting-screw $u^2$ $u^3$ and the striking-pieces $a$ $a'$.

Fig. 9$^a$ illustrates the construction where the trough T is partly lifted, together with the portions belonging to same. The trough T is rotatably connected at its rear portion $t$ with the frame G and rests upon the side supporting-rod $T'$, whereby the trough is lifted and lowered at its front end, whereby the said trough passes from the lowest to the highest position, as indicated by dotted lines, and the liquid, as shown, comes in contact with the articles in the net $h$. The remaining parts of the machine of this construction operate in the same manner as the machine represented in Fig. 9, while in this construction also the transporting-cloth N can be carried forward by the swinging movement of the trough.

Fig. 10 shows the coating-machine for system 3 in plan with one trough-wall broken away. The grating can in this construction be omitted, for which reason the net $h$ is placed upon the floor of the trough T. The turning-shaft A, with the net-carrier H, is journaled in the frame, whereby the standards Q of the steadying device are fastened to the trough T, which is rigidly connected to the frame G. The trough T has a recess T⁰ for the reception of the liquid and of a float V, which is connected by the rod V' with the pedals U⁴, and upon the descent of the said pedal the float is depressed into the liquid, whereby the liquid exudes from T⁰ and washes the articles in the net $h$, held down by the steadying device R, the said articles thus becoming covered. When the pedal U⁴ again ascends, the liquid again returns to T⁰, whereupon the articles are slightly struck by the hammer F in the manner hereinbefore described and laid over upon the transporting-cloth, which is moved forward by means of the lever N upon the shaft U³; also, here the depth to which the articles are immersed in the liquid and the regulation of the float is effected by the adjusting-screws $u^2$ $u^3$. In the machine shown in Figs. 8 to 10 the moved masses can be compensated by the corresponding counterweights.

In the machine shown in Figs. 1 and 2 the articles are dipped automatically into the coating liquid by the revolution of the shaft A. In the construction shown in Fig. 8 only the shifting movement of the transporting-cloth M is effected automatically. It is quite evident that all the movements executed by hand in the machine of Figs. 9 and 10 may also be automatically effected from the shaft D. To attain this purpose, the trough T of Fig. 9 or the float V of Fig. 10 is connected with the levers C, as in the construction shown in Fig. 1 and 2. The machine of Fig. 9 is provided with projections E', and the shaft as well as the disk E must be separately journaled in a frame. As regards the other movements which effect the shaking and the turning or laying over of the covered articles the same mechanism is used as described with reference to the construction of Figs. 1 and 2.

Having thus fully described the nature of this invention, what we desire to secure by Letters Patent of the United States is—

1. In a machine for coating confectionery, biscuits and the like, with chocolate and the like, the combination with a trough containing the liquid covering material, of a wire net $h$ of suitable form, a turning or laying over device, a shaft A adapted to turn said net, a wire-net carrier H, connecting the shaft A with the said wire net $h$ in such manner that the same may be put in and out of gear, a lowering and raising device, a steadying device R adapted to hold the articles to be coated in position, a shaking device adapted to remove the excess of the coating liquid, a transporting-cloth M adjustable as regards its height, and adapted to receive and conduct away the coated articles swung upon the cloth by the movement of the said shaft A and the net-carrier H, all the said movements being transmitted from the shaft D actuated by power, as set forth.

2. In a machine for coating confectionery, biscuits and the like with chocolate and the like, the combination of a trough containing the liquid covering material, of a wire net $h$ of suitable form, a turning or laying over device, a shaft A adapted to turn said net, a wire-net carrier H, consisting of the rods H⁰ provided with grooves, in which grooves the said wire net $h$ is arranged, the said rods H⁰ being adjustably attached to the arms H' square sockets H² in which the arms H' are arranged, the said sockets being connected together by the rod H³ and provided with conical sockets H⁴ adapted to receive the conical pins A' located upon the shaft A, a steadying device R adapted to hold the articles to be coated in position, a shaking device adapted to remove the excess of the coating liquid, a transporting-cloth M adjustable as regards its height, and adapted to receive and conduct away the coated articles swung upon the cloth by the movement of the said shaft A and the net-carrier H, all the said movements being transmitted from the shaft D actuated by power, as set forth.

3. In a machine for coating confectionery, biscuits and the like with chocolate and the like, the combination with a trough containing the liquid covering material, of a wire net $h$ of suitable form, a turning or laying over device, a shaft A adapted to turn said net, a wire-net carrier H, connecting the shaft A with the said wire net $h$ in such manner that the same may be put in and out of gear, a lowering and raising device, a steadying device R consisting of the vertical rods Q, a frame R' links Q⁰, arms R⁰, the said frame R' being connected with the vertical rod Q by means of the said links Q⁰ and the said arms R⁰, wires $r'$ attached to the said frame and adapted to hold the said articles to be coated in position, a shaking device adapted to remove the excess of the coating liquid, a transporting-cloth M adjustable as regards its height, and adapted to receive and conduct away the coated articles swung upon the cloth by the movement of the said shaft A and the net-carrier H, all the said movements being transmitted from the shaft D actuated by power, as set forth.

4. In a machine for coating confectionery, biscuits and the like, with chocolate and the like, the combination with a trough containing the liquid covering material, of a wire net $h$ of suitable form, a turning or laying over device, a shaft A adapted to turn said net, a wire-net carrier H connecting the shaft A with the said wire-net $h$ in such manner that the same may be put in and out of gear, a lowering and raising device, consisting of a lever C journaled at its one end in a standard G⁰, and at its other end adapted to receive the said net $h$, the net-carrier H and the steadying-device R, a disk E upon the shaft D, and provided with recesses E', rollers C² attached to the lever C, said recesses being adapted to engage with the said rollers C², levers C³ C⁴, and adjusting-spindle C⁶ provided with a hand-wheel C⁷, said adjusting-spindle adapted to limit the downward movement of the lever C, a shaking device adapted to remove the excess of the coating liquid, a transporting-cloth M adjustable as regards its height, and adapted to receive and conduct away the coated articles swung upon the cloth by the movement of the said shaft A and the net-carrier H, all the said movements being transmitted from the shaft D actuated by power, as set forth.

5. In a machine for coating confectionery, biscuits and the like, with chocolate and the like, the combination with a trough containing the liquid covering material, of a wire net $h$ of suitable form, a turning or laying over device having a shaft A adapted to turn said net, a wire-net carrier H, connecting the shaft A with the said wire net $h$ in such manner that the same may be put in and out of gear, a lowering and raising device, a steadying device R adapted to hold the articles to be coated in position, a shaking device consisting of a toothed segment S upon the shaft D, an adjusting-screw $f$ arranged upon the hammer F, provided with a pin $f'$, adapted by engaging with the teeth of the segment S, to raise and drop the said hammer F, a transporting-cloth M adjustable as regards its height, and adapted to receive and conduct away the coated articles swung upon the cloth by the movement of the said shaft A and the net-carrier H, all the said movements being transmitted from the shaft D actuated by power, as set forth.

6. In a machine for coating confectionery, biscuits and the like, with chocolate and the like, the combination with a trough containing the liquid covering material, of a wire net $h$ of suitable form, a turning device, said turning device consisting of a lever L, the two levers J J', a sprocket-wheel K upon the shaft A, a chain $K^0$ engaging with said chain-wheel, the said two levers J J' being oscillated by means of the said lever L and the spring $J^0$, whereby the turning or laying over of the coated articles is effected, a wire-net carrier H, connecting the shaft A with the said wire net $h$ in such manner that the same may be put in and out of gear, a lowering and raising device, a steadying device R adapted to hold the articles to be coated in position, a shaking device adapted to remove the excess of the coating liquid, a transporting-cloth M adjustable as regards its height, and adapted to receive and conduct away the coated articles swung upon the cloth by the movement of the said shaft A and the net-carrier H, all the said movements being transmitted from the shaft D actuated by power, as set forth.

7. In a machine for coating confectionery, biscuits and the like, with chocolate and the like, the combination with a trough containing the liquid covering material, of a wire net $h$ of suitable form, a turning or laying over device, a shaft A adapted to turn said net, a wire-net carrier H, connecting the shaft A with the said wire net $h$ in such manner that the same may be put in and out of gear, a lowering and raising device, a steadying device R adapted to hold the articles to be coated in position, a shaking device adapted to remove the excess of the coating liquid, a transporting-cloth M conducted over rollers upon the shaft $M^0$ and M' mounted between $\sqsubset$-shaped rails, the latter being pivoted at $C^0$ and adjustable in their height by the link $y^2$, the double crank-lever $y'$ $y^3$ having its bearing $y$ in a standard Y, said double crank-lever being adjustable by means of a spindle $y^4$, provided with a hand-wheel $y^5$, said transporting-cloth or endless band adapted to receive and conduct away the coated articles swung upon the cloth by the movement of the said shaft A and the net-carrier H, all the said movements being transmitted from the shaft D actuated by power as set forth.

In witness whereof we have hereunto set our hands in presence of two witnesses.

CARL FORCKE.
NICOLAUS FRINGS.

Witnesses:
C. WIGAND,
KIRKE LATHROP.